United States Patent [19]

Moore

[11] 4,076,776
[45] Feb. 28, 1978

[54] CALCIUM CHLORIDE PRILLING

[75] Inventor: William G. Moore, Midland, Mich.

[73] Assignee: The Dow Chemical Company, Midland, Mich.

[21] Appl. No.: 564,248

[22] Filed: Apr. 2, 1975

[51] Int. Cl.$^2$ .............................................. B01J 2/06
[52] U.S. Cl. ..................................................... 264/13
[58] Field of Search ..................................... 264/5, 13

[56] References Cited

U.S. PATENT DOCUMENTS

| 2,337,928 | 12/1943 | Reichel | 264/37 |
| 2,923,033 | 2/1960 | Baldwin et al. | 264/13 |
| 3,653,222 | 4/1972 | Dunn et al. | 264/13 |

FOREIGN PATENT DOCUMENTS 937,447  9/1963  United Kingdom.

*Primary Examiner*—Robert F. White
*Assistant Examiner*—James R. Hall
*Attorney, Agent, or Firm*—R. W. Selby; J. M. Kuszaj

[57] ABSTRACT

An improved method to prill calcium chloride comprising feeding a molten, aqueous calcium chloride solution into a boiling refrigerant with a boiling temperature less than the freezing temperature of the solution. The solution is fed into the boiling refrigerant from an opening positioned upwardly from and spaced apart from the upper surface of the refrigerant.

13 Claims, 1 Drawing Figure

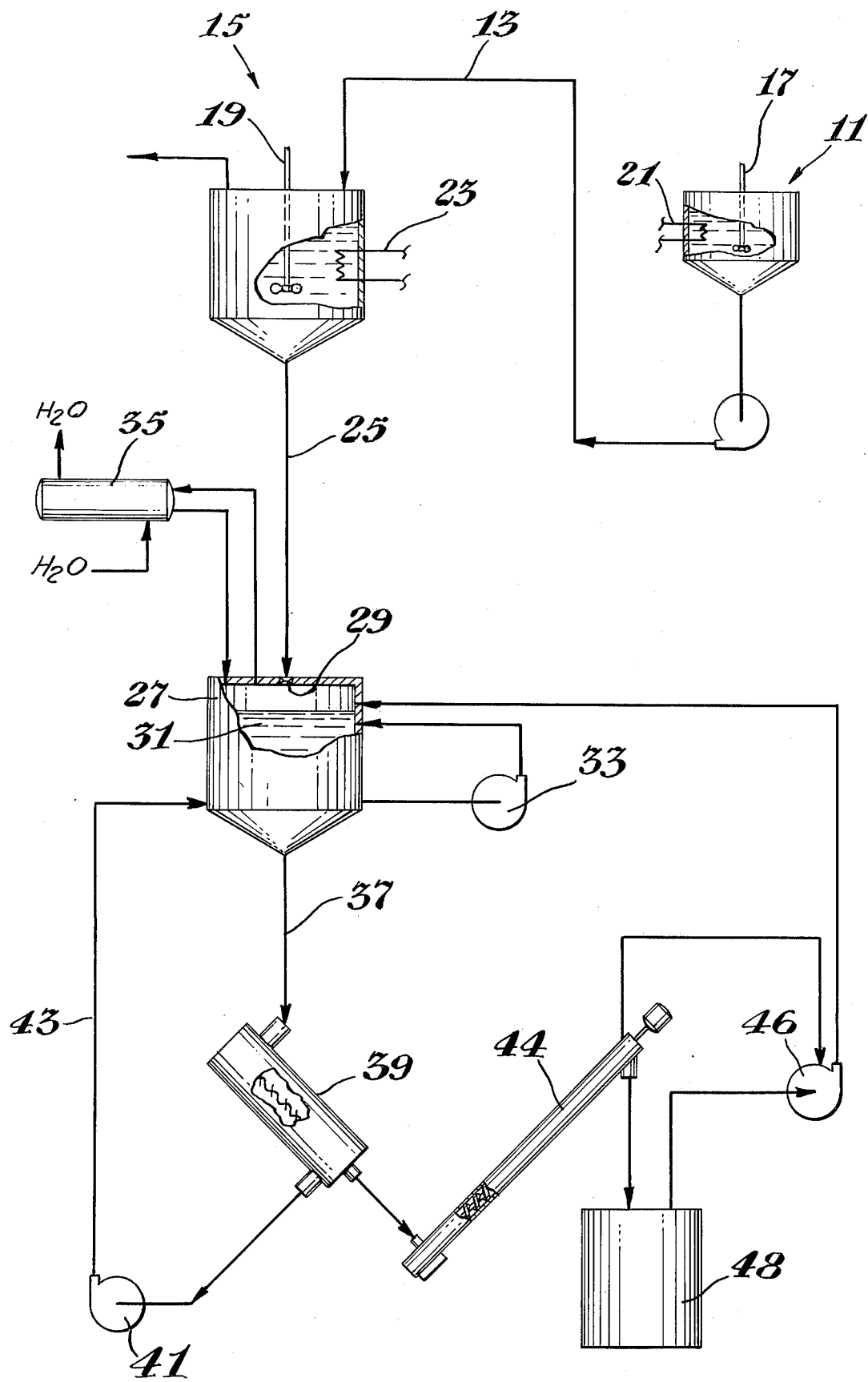

CALCIUM CHLORIDE PRILLING

BACKGROUND OF THE INVENTION

This invention relates to calcium chloride and more in particular to a prilling process to produce calcium chloride particulate.

Calcium chloride flakes or semi-spherical particulates have previously been produced commercially by various methods. Such particulates have been found to be beneficially employed as, for example, a desiccant or as a means to melt ice on highways. An improved process to rapidly produce calcium chloride particulates is desired.

SUMMARY OF THE INVENTION

An improved method to produce hydrated calcium chloride particulates includes contacting a molten aqueous calcium chloride solution (hereinafter referred to as calcium chloride) with a boiling liquid refrigerant. The liquid refrigerant necessarily boils at a temperature of less than the freezing temperature of the calcium chloride. Contact between the calcium chloride and the refrigerant causes rapid solidification of the molten calcium chloride into solid particulates. After the calcium chloride solidifies the particulates are removed from the boiling refrigerant.

The hydrated calcium chloride particulates of the present process are beneficially employed as a desiccant or as a means to melt and thereby remove, ice from roadways.

DESCRIPTION OF THE DRAWING

The accompanying drawing schematically illustrates one embodiment of the calcium chloride prilling process of the invention.

DESCRIPTION OF THE PREFERRED EMBODIMENTS

A preferred process to form sphere-like shaped, hydrated calcium chloride particulates from a molten, aqueous calcium chloride solution comprises feeding the molten calcium chloride into a boiling liquid refrigerant by passing the calcium chloride through an opening in a boiling refrigerant container and causing the calcium chloride to fall downwardly into such refrigerant. The opening, or inlet, in the container is positioned a sufficient distance above the upper surface of the refrigerant to permit the molten calcium chloride to form droplets before contacting the refrigerant. The distance in the refrigerant container between the calcium chloride inlet and the refrigerant surface is hereinafter termed the "free-fall distance."

After contacting the boiling refrigerant, the individual molten calcium chloride droplets rapidly solidify to provide a plurality of distinct calcium chloride hydrate particles. The boiling refrigerant is selected to have a density sufficient to permit settling of the calcium chloride particles at a rate such that the solidified calcium chloride particles will not detrimentally intermix with, and adhere to, the molten calcium chloride droplets entering into the refrigerant.

To promote the solidification of individual non-agglomerated particles, the refrigerant is agitated by means of, for example, a pump or stirring mechanism, while introducing the molten calcium chloride into the refrigerant. Such agitation, or mixing, is sufficient to minimize, and preferably substantially entirely prevent, agglomeration or adhering together of the individual particles and insufficient to cause the unsolidified particles to be forced against, and firmly adhere to, wall portions of the refrigerant container.

After the solidified calcium chloride containing particles settle in the container, the particles are removed from the refrigerant by means known to those skilled in the art, for example, by filtering, decanting, evaporating the refrigerant and the like.

Generally the aqueous calcium chloride fed into the refrigerant is a brine containing at least about 70 weight percent $CaCl_2$. The molten calcium chloride contains from about 70 to about 85 weight percent $CaCl_2$ to obtain a preferred calcium chloride dihydrate particle. Impurities, such as sodium chloride, potassium chloride and strontium chloride, affect the solidification temperature of the calcium chloride.

When a feed solution containing about 74 to about 78 weight percent $CaCl_2$ is employed to produce calcium chloride dihydrate particulates, it is desirable to employ a feed rate of up to about 825, and preferably up to about 500, pounds of solution per hour per square foot of refrigerant surface area and a free-fall distance of at least about 8 inches. Although the maximum free-fall distance is not critical, a preferred free-fall range is from about 2 to about 4 feet. When these preferred operating parameters are used, the calcium chloride particulates will be substantially uniform in size and substantially spherical in shape. The opening in the refrigerant container, through which the molten calcium chloride is passed, can be an orifice or spray nozzle of various sizes and shapes. The size of the orifice together with the feed rate and free-fall distance are factors in the final size, shape and physical properties of the calcium chloride particles formed.

In practicing the described process to produce calcium chloride dihydrate particulates, the molten calcium chloride is preferably sprayed into an enclosed container, which is partially filled with a boiling refrigerant, through an orifice suited to provide a cone-like spray pattern. The gauge pressure within this container is generally up to about 120 pounds per square inch and preferably within the range of from about 25 to about 120 pounds per square inch. The calcium chloride feed is maintained within a preferred temperature range of from about 225° to about 285° C while the refrigerant is boiling; for example, trichlorofluoromethane is maintained at about 60° to about 100° C.

It is desirable to agitate the refrigerant within the container during cooling of the calcium chloride by, for example, means of the well-known impeller and/or a pump-type recirculatory system for the liquid refrigerant. The agitation is beneficial to cool and solidify the molten calcium chloride into indiviudal particles of a substantially uniform size and configuration.

Liquid refrigerants suitable in the process of the present invention are substantially physically and chemically inert to the calcium chloride and boil at a temperature of less than the freezing temperature of the calcium chloride. By use of a boiling refrigerant it is unnecessary to use an external cooling means or heat exchanger to remove heat from the solidifying calcium chloride or from the liquid refrigerant. Thus, difficulties generally encountered with heat exchangers for liquids are minimized. Suitable refrigerants are butane; pentane; trichlorofluoromethane; perchloroethylene; 1,1,1-trichloroethane; and methylene chloride; however, pentane and trichlorofluoromethane are preferred.

Referring now to the drawing, which schematically illustrates the calcium chloride prilling process, calcium chloride is first fed into a brine container 11 by suitable means and thereafter passed through a conduit or pipe 13 to a concentrator tank 15. The brine container 11 and the concentrator 15 optionally include agitating means 17 and 19 and calcium chloride temperature control means 21 and 23. The concentrator 15 increases the calcium chloride concentration from the concentration of the solution in the brine container 11 to that concentration desired in the final solidified particulate. The concentrated calcium chloride solution is passed from the concentrator 15 through a conduit or pipe 25 into a boiling refrigerant container 27. The calcium chloride solution is fed into the refrigerant container 27 through an orifice 29 and then falls into the boiling refrigerant 31 as a multiplicity of distinct liquid droplets.

A liquid refrigerant mixing means or pump 33 is preferably employed to agitate the refrigerant within the container 27. A certain portion of the liquid refrigerant will be volatilized and form a gas during the process. The gaseous refrigerant can be condensed and recirculated to the container 27 by means of, for example, a condenser and pump assembly 35.

The solid calcium chloride particles are removed from the refrigerant container 27 and passed into a screen system 39 through a means 37 suited to remove the solid calcium chloride particles from and retain liquid refrigerant in the refrigerant container 27. The screen system 39 is adapted to separate the calcium chloride from refrigerant passing through the removal means 37. The separated liquid refrigerant can be recirculated to the refrigerant container 27 by means of a pump 41 in combination with a conduit 43.

The calcium chloride particulate exiting the screen system 39 can, optionally, be passed through a vaporizer 44 to therein vaporize and remove substantially all of the remaining refrigerant from the solid particulates. The vaporized refrigerant can thereafter be liquefied by, for example, a compresser 46 and recirculated to the refrigerant container 27. The calcium chloride product exiting from the vaporizer 44 is in a form suitable for use when it enters product containers or drums 48.

The following examples further illustrate the invention.

EXAMPLE 1

Spherical calcium chloride dihydrate particles with a $CaCl_2$ concentration of 74.5 weight percent (based on $CaCl_2$ plus water) and the remainder being essentially water and impurities were produced substantially as described for the drawing. An aqueous calcium chloride solution was concentrated to about 75 weight percent $CaCl_2$. In addition to water, the concentrated solution contained as impurities by weight about $\frac{1}{2}$ percent NaCl, about 1.2 percent KCl and about $1\frac{1}{2}$ to 2 percent $SrCl_2$.

The concentrated solution, maintained at 225° C, was sprayed through a 5/32 inch diameter orifice downwardly into a trichlorofluoromethane refrigerant in a 36 inch diameter by 72 inch high refrigerant container with a cone shaped lower section. The trichlorofluoromethane was boiling at a temperature of between 25° and 67° C under a gauge pressure of 0–40 pounds per square inch.

During operation, the upper surface of the boiling refrigerant was substantially free of undissolved water to minimize undesired agglomeration of the molten calcium chloride droplets. Agitation of the refrigerant was carried out by means of a pump to recirculate the liquid refrigerant. Volatilized refrigerant was condensed and returned to the refrigerant container as a liquid. Use of a heat exchanger to supplement the cooling provided by the boiling trichlorofluoromethane was unnecessary.

The calcium chloride dihydrate product contained by weight 12 to 19 percent +4 mesh particles (US Standard Sieve Series), 1 to $2\frac{1}{2}$ percent −20 mesh particles with the remainder being a size between −4 and +20 mesh. The product is suitable for melting ice.

EXAMPLE 2

Particulates containing by weight 73.2 percent $CaCl_2$ (based on $CaCl_2$ plus water), about 1 to $1\frac{1}{2}$ percent NaCl, about 2.2 percent KCl and about one percent $SrCl_2$ were produced substantially as described in Example 1. The calcium chloride solution was maintained molten at a temperature of 222° C while the atmosphere within refrigerant container was maintained at 0–31 pounds per square inch gauge pressure. The refrigerant was boiling at temperatures of from 25° to 60° C. The particulates or pellets formed were generally spherical in shape and the majority were of a size from +20 mesh to −4 mesh with less than one weight percent being +4 mesh and about 3 to 5 weight percent being −20 mesh.

EXAMPLE 3

An aqueous brine containing by weight 75 percent $CaCl_2$ (based on $CaCl_2$ plus water), about 1 to $1\frac{1}{2}$ percent NaCl, about 5 percent KCl and about $1\frac{1}{2}$ to 2 percent $SrCl_2$ was pelleted by the process of Example 1. The brine was maintained at 230° C and sprayed through a $\frac{1}{4}$ inch diameter orifice into a refrigerant container where the brine formed droplets before entering the trichlorofluoromethane. The container was controlled at a gauge pressure of 10 pounds per square inch while the refrigerant was 36° C. Any vaporized refrigerant was condensed and recycled into the liquid refrigerant container. It was determined that the process should be carefully controlled when utilizing the brine of the present example. The product contained by weight 71.7 percent $CaCl_2$ (based on $CaCl_2$ plus water). Of the pellets produced, 39.2 weight percent were a size of −20 mesh and the remainder were within the range of +20 to −4 mesh.

Substantially as described in Example 1, calcium chloride solutions are solidified by contacting molten calcium chloride solutions with the individual refrigerants butane; pentane; trichlorofluoromethane; perchloroethylene; 1,1,1-trichloromethane; and methylene chloride.

What is claimed is:

1. A method to produce calcium chloride particulate comprising:
   a. passing a molten aqueous solution of calcium chloride into an enclosed container of boiling liquid refrigerant, said refrigerant having a boiling temperature of less than the freezing temperature of the calcium chloride solution;
   b. allowing the calcium chloride solution to fall a sufficient distance from above the boiling liquid refrigerant to permit the calcium chloride solution to form droplets before contacting the liquid refrigerant;
   c. solidifying the calcium chloride solution droplets in the boiling liquid refrigerant as prills; and d. removing the formed prills from the boiling liquid refrigerant.

2. The method of claim 1 including removing volatilized refrigerant from the container in which the calcium chloride solution is solidified, condensing the volatilized refrigerant and then recirculating the condensed refrigerant to the container.

3. The method of claim 1 including maintaining pressure within the container wherein the calcium chloride solution is solidified at a gauge pressure of within the range of from about 25 to about 30 lbs. per square inch.

4. The method of claim 1 wherein the calcium chloride solution contains from at least about 70 weight percent $CaCl_2$.

5. The method of claim 1 wherein the calcium chloride solution contains from about 70 to about 85 weight percent $CaCl_2$.

6. The method of claim 1 wherein the calcium chloride solution contains from at least about 74 to about 78 weight percent $CaCl_2$.

7. The method of claim 1 wherein the refrigerant is selected from the group consisting of butane; pentane; trichlorofluoromethane; perchloroethylene; 1,1,1-trichloromethane; and methylene chloride.

8. The method of claim 1 wherein the refrigerant is selected from the group consisting of pentane and trichlorofluoromethane.

9. The method of claim 1 including solidifying the calcium chloride solution droplets in the boiling liquid refrigerant to form calcium chloride dihydrate particulate prills.

10. A method to produce calcium chloride particulate from a molten, aqueous calcium chloride solution comprising feeding molten calcium chloride solution containing from about 70 to about 85 weight percent $CaCl_2$ into a boiling liquid refrigerant by passing the calcium chloride solution through an opening positioned in a wall portion of a refrigerant container from a sufficient distance above the upper surface of the refrigerant to form molten calcium chloride solution droplets before contacting the boiling refrigerant with the calcium chlorides; solidifying the calcium chloride droplets in the boiling refrigerant; and removing the solidified calcium chloride particulate from the refrigerant.

11. The method of claim 10 wherein the solution contains about 74 to about 78 weight percent $CaCl_2$ and the particulate is calcium chloride dihydrate.

12. The method of claim 11 including the additional steps of liquefying refrigerant vaporized during solidification of the calcium chloride solution and then recirculating the liquefied refrigerant to the refrigerant container.

13. A method to produce calcium chloride particulate comprising:
 a. passing a molten aqueous calcium chloride solution into a boiling liquid refrigerant from a sufficient distance above the upper surface of the refrigerant to form molten calcium solution droplets before contacting the boiling refrigerant;
 b. solidifying the calcium chloride droplets in the boiling refrigerant; and
 c. removing the solidified calcium chloride particulate from the refrigerant, said refrigerant being characterized as having a boiling temperature of less than the freezing temperature of the calcium chloride solution and having a density sufficient to permit settling of calcium chloride particulate through the refrigerant.

* * * * *